United States Patent
Schmidl et al.

(10) Patent No.: US 9,319,095 B2
(45) Date of Patent: *Apr. 19, 2016

(54) DSSS INVERTED SPREADING FOR SMART UTILITY NETWORKS

(71) Applicant: Texas Instruments Incorporated, Dallas, TX (US)

(72) Inventors: Timothy Mark Schmidl, Dallas, TX (US); Anand G. Dabak, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/719,405

(22) Filed: May 22, 2015

(65) Prior Publication Data

US 2015/0256217 A1  Sep. 10, 2015

Related U.S. Application Data

(63) Continuation of application No. 13/930,540, filed on Jun. 28, 2013, now Pat. No. 9,077,442.

(60) Provisional application No. 61/672,074, filed on Jul. 16, 2012.

(51) Int. Cl.
*H04B 1/00* (2006.01)
*H04B 1/707* (2011.01)
*H04B 1/7085* (2011.01)
(Continued)

(52) U.S. Cl.
CPC .............. *H04B 1/707* (2013.01); *H04B 1/7085* (2013.01); *H04L 5/0048* (2013.01); *H04L 27/22* (2013.01)

(58) Field of Classification Search
CPC ...... H04B 1/707; H04B 1/7085; H04L 27/22; H04L 5/0048
USPC .......... 375/146, 147, 140, 145, 150; 370/479, 370/329, 208, 498
See application file for complete search history.

(56) References Cited

U.S. PATENT DOCUMENTS 6,934,317 B1  8/2005  Dent
8,660,167 B2  2/2014  Wehinger
(Continued)

FOREIGN PATENT DOCUMENTS

CN  1321374  11/2001
CN  1505878  6/2004
(Continued)

OTHER PUBLICATIONS

IEEE Std 802.15.4.g-2012 Specification.
(Continued)

*Primary Examiner* — Dhaval Patel
(74) *Attorney, Agent, or Firm* — Tuenlap D. Chan; Frank D. Cimino

(57) ABSTRACT

A method of operating a transmitter (FIGS. 3A and 5A) is disclosed. The method includes receiving a sequence of data bits (DATA), wherein each data bit has a respective sequence number. A first data bit of the sequence is spread (508) with a first spreading code (504) determined by the sequence number (502) of the first data bit. A second data bit of the sequence is spread (508) with an inverse of the first spreading code (506) determined by the sequence number (502) of the second data bit. The first and second data bits are modulated (510) and transmitted (516) to a remote receiver.

20 Claims, 8 Drawing Sheets

(51) Int. Cl.
*H04L 5/00* (2006.01)
*H04L 27/22* (2006.01)

(56) References Cited

U.S. PATENT DOCUMENTS

| | | |
|---|---|---|
| 9,077,442 B2 | 7/2015 | Schmidl et al. |
| 2001/0048712 A1 | 12/2001 | Tomita et al. |
| 2003/0091130 A1 | 5/2003 | Terashima et al. |
| 2004/0125861 A1* | 7/2004 | Chang .......................... 375/146 |
| 2004/0137946 A1 | 7/2004 | Kawabata |
| 2004/0258131 A1* | 12/2004 | Margon ........................ 375/130 |
| 2005/0175072 A1* | 8/2005 | Mack et al. .................... 375/146 |
| 2009/0207889 A1 | 8/2009 | Kobayashi et al. |
| 2014/0016675 A1 | 1/2014 | Schmidl et al. |

FOREIGN PATENT DOCUMENTS

| | | |
|---|---|---|
| CN | 1564497 | 1/2005 |
| CN | 101604978 | 12/2009 |

OTHER PUBLICATIONS

Notification of First Office Action, including Search Report, in corresponding Chinese Patent Application No. 2013800350121, issued Nov. 27, 2015.

* cited by examiner

DSSS INVERTED SPREADING FOR SMART UTILITY NETWORKS

This application claims the benefit under 35 U.S.C. §120 of non-provisional application Ser. No. 13/930,540, filed Jun. 28, 2013 (TI-72635), issued as U.S. Pat. No. 9,077,442 on Jul. 7, 2015, which claims the benefit under 35 U.S.C. §119(e) of Provisional Appl. No. 61/672,074, filed Jul. 16, 2012 (TI-72635PS), both of which are incorporated herein by reference in its entirety.

BACKGROUND

The present embodiments relate to wireless communication systems and, more particularly, to inverted spreading of a direct sequence spread spectrum (DSSS) smart utility network (SUN).

A smart utility network (SUN) is a low rate (40 kb/s to 1 Mb/s), low power wireless technology that is specifically designed to be used in utility metering applications, such as transmitting electric, gas, or water usage data from the meter(s) on the customer premises to a data collection point (hub) operated for the utility. For example, meters could be installed for each house in a residential neighborhood, and then the data could be sent every 15 minutes from each meter to a pole top data collection point. This data collection point could then be connected by fiber, copper wire, or wireless to a central office which collects all the data for a region. Data could either be sent directly from each meter to the collection point (star configuration), or it could be hopped from meter to meter until it reaches the collection point (mesh configuration).

There are different physical layers (PHYs) that can be used for SUN including FSK (frequency shift keying), DSSS (direct sequence spread spectrum), and OFDM (orthogonal frequency division multiplexing). Devices that are allowed into a closed utility network may be controlled by the utility or the network operator. A smart utility network (SUN) standard specification is also known as the IEEE 802.15.4g specification and is incorporated by reference herein in its entirety.

A network may be set up in a mesh configuration where devices can communicate with neighbor devices rather than just with a hub. This helps to increase coverage since communication can be achieved even if the link directly to the hub is not good. However, this can increase the amount of traffic that goes through some devices since they have to include packet data from their neighbors as well as their own data. A mesh network may be appropriate for an urban or suburban area with a high density of meters and non-line-of-sight conditions between meters so that communication links between some meters and a hub is poor.

A star configuration is one where a hub communicates directly with each meter. This could be appropriate for rural environments when the density of meters is low so that there may not be a convenient neighbor to use as an intermediate hop. A mix between a star and mesh configuration can also be used in some deployments.

Since meters have a long life span such as 20 years, there may be many generations of meters deployed in a utility network. Earlier deployed meters are often referred to as legacy equipment. In one embodiment all legacy the devices in the utility network may communicate using FSK, often at a fixed data rate such as 50 kb/s, 100 kb/s or 150 kb/s.

The DSSS (direct sequence spread spectrum) PHY (physical layer) uses offset QPSK (O-QPSK) modulation with a chip rate of either 100 kchip/s, 1000 kchip/s, or 2000 kchip/s. The term offset means that the in-phase (I) and quadrature (Q) channels are offset by one chip time. For the 100 kchip/s mode, there is a preamble of 32 zeros with each bit spread by a spreading code of length 32. This results in a preamble of length 10240 microseconds with a repetition period of 320 microseconds. For the 1000 kchip/s mode, there is a preamble of 56 zeros with each bit spread by a spreading code of length 64. This results in a preamble of length 3584 microseconds with a repetition period of 64 microseconds. For the 2000 kchip/s mode, there is a preamble of 56 zeros with each bit spread by a spreading code of length 128. This results in a preamble of length 3584 microseconds with a repetition period of 64 microseconds.

A DSSS packet consists of a synchronization header (SHR), which contains the preamble and start frame delimiter (SFD), a physical layer header (PHR), and a physical layer payload (PSDU). For the 1000 kchip/s mode the SFD consists of 16 bits which are spread with a spreading code of length 64. The MAC header, payload, and CRC are all contained within the PSDU. The SFD bit sequence is 1 1 1 0 1 0 1 1 0 1 1 0 0 0 1 0.

The PHY header consists of 24 bits as is shown below:

| | Bit string index | | | | | | |
|---|---|---|---|---|---|---|---|
| | 0 | 1 | 2 | 3 | 4 | 5-15 | 16-23 |
| Bit mapping | SM | RM1 | RM0 | R1 | R0 | L10-L0 | H7-H0 |
| Field name | Spreading Mode | Rate Mode | | Reserved | | Frame Length | HCS |

The spreading mode (SM) field is set to 0 when DSSS is used for PSDU spreading. There are 4 rate modes for DSSS. Rate Mode 0 has a spreading factor of 16 and a data rate of 31.25 kb/s. Rate Mode 1 has a spreading factor of 4 (which is implemented with a (16,4) spreading code) and a data rate of 125 kb/s. Rate Mode 2 has a spreading factor of 2 (which is implemented with a (8,4) spreading code) and a data rate of 250 kb/s. Rate Mode 3 does not use spreading and has a data rate of 500 kb/s. For all rate modes the PSDU is coded with a rate ½, k=7 convolutional code.

The reserved bits are set to 0, and these may be used later to allow future evolution of the standard. The frame length is the length of the PSDU in octets, so the PSDU can contain up to 2047 octets (bytes). The header check sequence is an 8-bit CRC check for the header.

The structure of the transmitter chain is shown in FIG. 1 which is taken from IEEE 802.15.4g specification. For the 902-928 MHz band the SHR contains the 56 preamble bits "all 0" and the 16 SFD bits. Bit differential encoding (BDE) is applied, but for the preamble there is no effect since the "0" bits remain "0" bits after differentially encoding with the previous bit. Then a 64-chip spreading is applied to the SHR. The PHR with the 24 bits shown above has 6 tails bits appended, and then a rate ½, k=7 convolutional code is applied, followed by an interleaver. Then a length 16 spreading code is applied. For the PSDU there 6 tails bits appended and then possibly some pad bits so that the interleaver has an integer number of blocks to process. Then the same rate ½, k=7 convolutional code is applied as was done for the PHR. After interleaving there are four possible rate modes that may be used. Rate mode 0 is the same spreading as is used for the PHR. There is no spreading for Rate mode 3. Rate mode 1 uses (16,4) spreading, so that for each 4 input bits there are 16 chips that are generated.

The chip timing for the O-QPSK modulator is shown in FIG. 2. The in-phase (I) and quadrature (Q) bits are offset in time by $T_c$, and $2 T_c$ is the duration in time of each bit.

For the 902-928 MHz band the O-QPSK pulse shape is a half sine wave pulse as shown in Equation [1] below.

$$p(t) = \sin\left(\frac{\pi t}{2T_C}\right) \text{ for } 0 \leq t \leq 2T_C, \text{ and } 0 \text{ otherwise} \qquad [1]$$

While the preceding approach specified in IEEE 802.15.4g provides wireless communications for smart utility networks, the applicants recognize that still further improvements are possible. One problem with using a block code such as an (8,4) code to spread two bits or a (16,4) code to spread four bits is that it is computationally complex to generate soft decisions that are necessary for a Viterbi decoder. For example, a hard decision for a BPSK symbol is simply +1 or −1. However, a soft decision is a decimal value with a more positive value indicating a more probable +1 and a more negative value indicating a more probable −1. This soft decision is not only computationally difficult, it is also less accurate than desired. Accordingly, the preferred embodiments described below are directed toward this as well as improving upon the prior art.

SUMMARY

In a preferred embodiment of the present disclosure, there is disclosed a method of operating a transmitter. The method includes receiving a sequence of data bits. Each data bit of the sequence has a respective sequence number. A first data bit of the sequence is spread with a first spreading code determined by the sequence number of the first data bit. A second data bit of the sequence is spread with an inverse of the first spreading code determined by the sequence number of the second data bit. The first and second data bits are modulated and transmitted to a remote receiver.

DETAILED DESCRIPTION OF THE INVENTION

Communication within a smart utility network must be reliable for many different configurations for rural as well as urban networks. Due to the longevity of existing utility hardware, any modification to existing specifications should be backwards compatible with existing hardware. Embodiments of the present disclosure, therefore, are directed to improved coding of a direct sequence spread spectrum (DSSS) communication system that may be readily employed in existing transmitters and receivers. Moreover, the present disclosure is directed to simplified encoding at the transmitter as well as simplified decoding at the receiver of legacy DSSS systems. In particular, the present disclosure is directed to inverted spreading, wherein one spreading sequence is used for even numbered bits, and an inverted spreading sequence is used for odd numbered bits. In another embodiment of the present disclosure, alternate bits may be inverted and a same spreading code may be applied to all bits.

Figure 1:
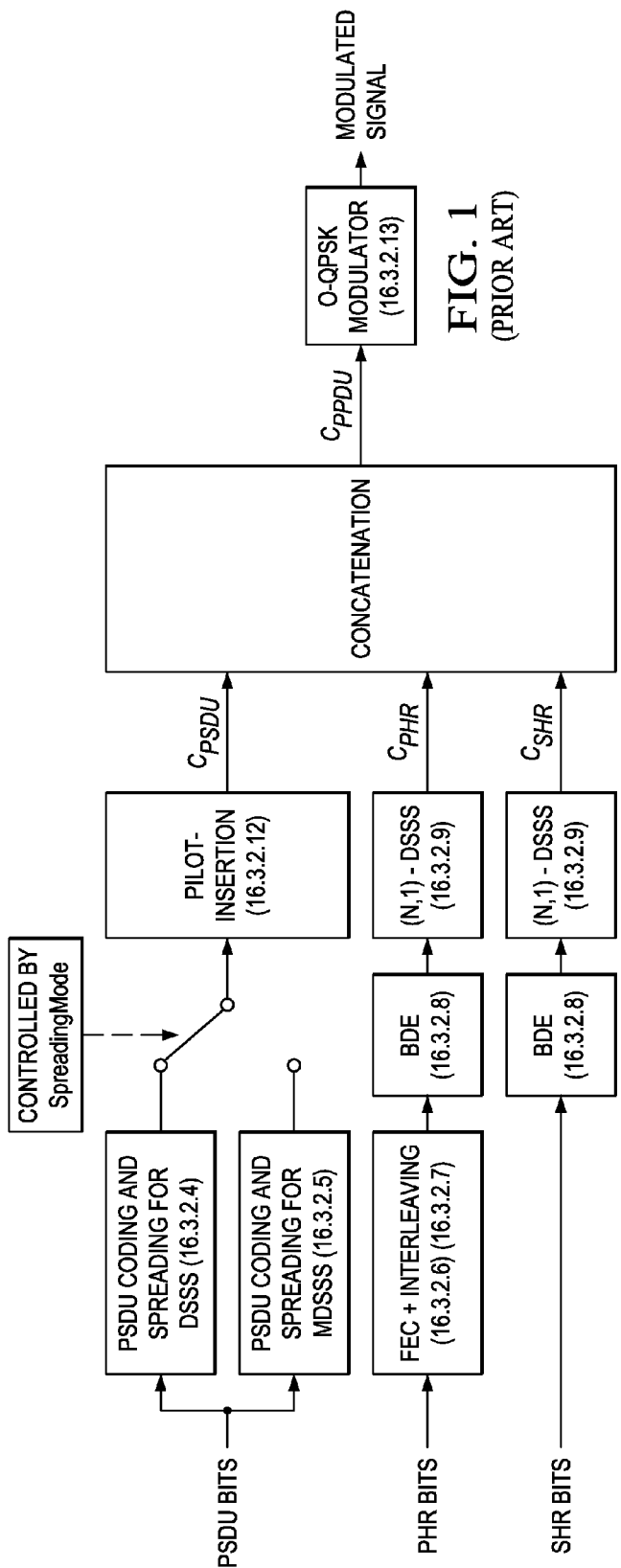
FIG. 1 is a diagram of a smart utility network (SUN) transmitter of the prior art as disclosed in the IEEE 802.15.4g specification.
Figure 2:
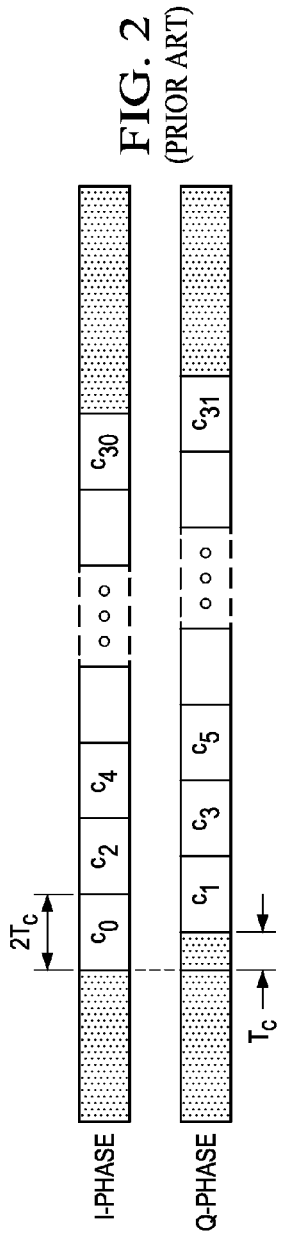
FIG. 2 is a chip timing diagram of an O-QPSK modulator that may be used with the SUN transmitter of FIG. 1.
Figure 3A:
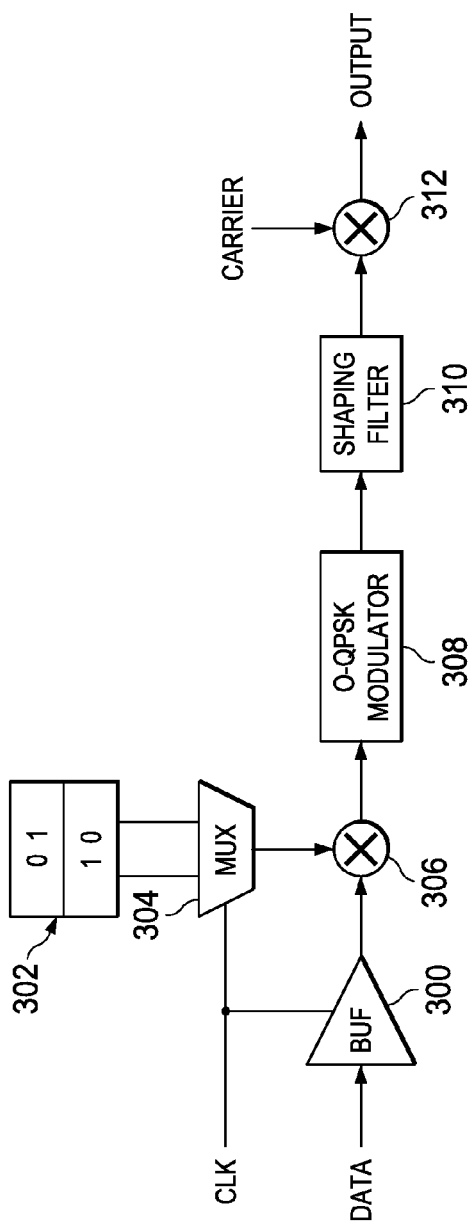
FIGS. 3A through 3D are block diagrams of various embodiments of wireless transmitters of the present disclosure.
Figure 5A:
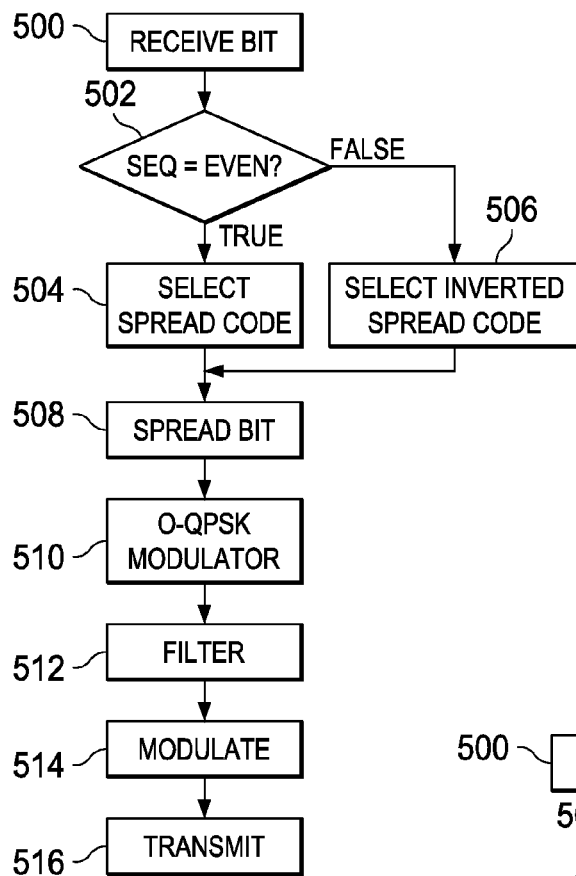
FIGS. 5A and 5B are flow charts showing operation of the transmitters of FIGS. 3A and 3B, respectively.

Referring to FIG. 3A, there is a block diagram of a first embodiment of a wireless transmitter of the present disclosure. The transmitter includes an input buffer 300 coupled to receive a data sequence (DATA). A multiplex circuit 304 is coupled to a memory circuit 302 having stored spreading code values. An exclusive OR (XOR) circuit 306 is coupled to receive a sequence of data bits from input buffer 300 and a selected spreading code via multiplex circuit 304. The XOR circuit 306 produces a spread data sequence which is an exclusive OR (XOR) of each bit with a respective spreading code. The spread data sequence is applied to offset quadrature phase shift keyed (O-QPSK) modulator 308 and, subsequently, to shaping filter 310. In some embodiments the modulator and shaping filter may be combined by using a lookup table to implement the combination of the two functions. The data sequence from shaping filter 310 is applied to modulator circuit 312 where it is modulated by a radio frequency (RF) carrier (CARRIER) and applied to an RF amplifier (not shown) for transmission to a remote receiver. Operation of the transmitter of FIG. 3A will now be explained with reference to the flow chart of FIG. 5A for a 2-chip spreading code. The transmitter receives a sequence of data bits 500 at input buffer 300. Each bit of the sequence has a respective sequence number which is either even or odd. The input buffer 300 is arranged to transmit one bit of the sequence for each half cycle of clock signal CLK. A low half cycle of clock signal CLK selects spreading code 01 from memory circuit 302. Correspondingly, a high half cycle of clock signal CLK selects spreading code 10, which is the inverse of spreading code 01. In this manner, the transmitter determines whether the data bit sequence is even or odd at step 502. During a low half cycle of CLK, spreading code 01 is selected at step 504. Likewise, during a high half cycle of CLK, inverted spreading code 10 is selected at step 506. XOR circuit 306 then produces a corresponding spread data sequence at step 508. O-QPSK circuit 308 then modulates the spread data sequence at step 508 and applies the modulated data sequence to shaping filter circuit 310 at step 512. The filtered data sequence is then modulated 312 by the RF CARRIER at step 514 and transmitted to a remote receiver. Table I below illustrates operation of the transmitter for an exemplary data sequence 0110 having corresponding sequence numbers 0 through 3 in the first row. The second row illustrates the spreading code selected by multiplex circuit 304. Here, spreading code 01 is selected for even sequence numbers 0 and 2. Correspondingly, spreading code 10 is selected for odd sequence numbers 1 and 3. The spread data sequence in the third row is the XOR of each data bit of the sequence with the respective chips of the selected spreading code. In the first column, for example, an XOR of data bit 0 with spreading code 01 produces spread data 01. In the second column, an XOR of data bit 1 with spreading code 10 produces spread data 01.

TABLE I

| DATA BIT (0-3) | 0 | 1 | 1 | 0 |
|---|---|---|---|---|
| SPREAD CODE | 01 | 10 | 01 | 10 |
| SPREAD DATA | 01 | 01 | 10 | 10 |

Figure 3B:
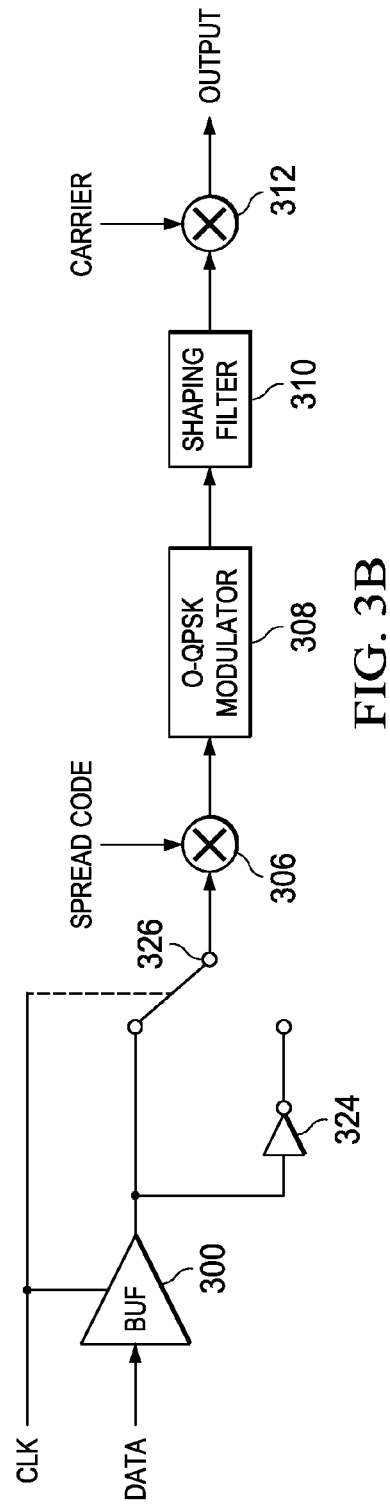

Referring next to FIG. 3B, there is a block diagram of a second embodiment of a wireless transmitter of the present disclosure. The transmitter includes an input buffer 300 coupled to receive a data sequence (DATA). A switching circuit 326 is coupled to receive either a data bit from buffer 300 or an inverted data bit produced by inverter 324 during each half cycle of CLK. The switching circuit may be a transmission gate or other suitable logic circuit as is well known in the art. Either the selected data bit or inverted data bit is then applied to XOR circuit 306. XOR circuit 306 is also coupled to receive a spreading code which is applied to either the selected or inverted data bit. The XOR circuit 306 produces a spread data sequence which is an exclusive OR (XOR) of each bit with spreading code. The spread data sequence is applied to O-QPSK modulator 308 and, subsequently, to shaping filter 310. The data sequence from shaping filter 310 is applied to modulator circuit 312 where it is modulated by a carrier and applied to an RF amplifier (not shown) for transmission to a remote receiver.

Figure 5B:
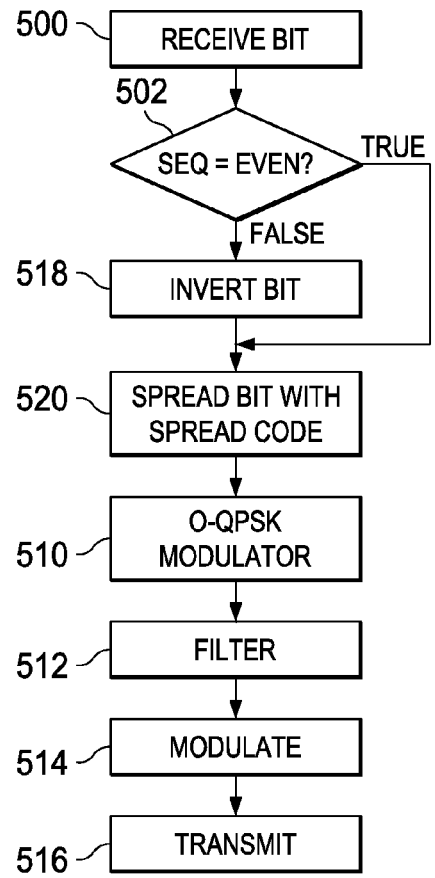

Operation of the transmitter of FIG. 3B will now be explained with reference to the flow chart of FIG. 5B for a 2-chip spreading code. The transmitter receives a sequence of data bits 500 at input buffer 300. Each bit of the sequence has a respective sequence number which is either even or odd. The input buffer 300 is arranged to transmit one bit of the sequence for each half cycle of clock signal CLK. A low half cycle of clock signal CLK transmits the data bit from buffer 300 to XOR circuit 306 via switching circuit 326. Correspondingly, a high half cycle of clock signal CLK transmits the inverted data bit from inverter 324 to XOR circuit 306 via switching circuit 326. In this manner, the transmitter determines whether the data bit sequence is even or odd at step 502. During a low half cycle of CLK the data bit is transmitted directly to XOR circuit 306. However, during a high half cycle of CLK, the inverted data bit from inverter 324 is transmitted to XOR circuit 306 at step 518. XOR circuit 306 then produces a spread data sequence at step 520 by applying a single spreading code to either the selected data bit or the inverted data bit. O-QPSK modulator 308 then modulates the spread data sequence at step 508 and applies the modulated data sequence to shaping filter circuit 310 at step 512. The filtered data sequence is then modulated 312 by the RF CARRIER at step 514 and transmitted to a remote receiver at step 516. Table II below illustrates operation of the transmitter for an exemplary data sequence 0110 having corresponding sequence numbers 0 through 3 in the first row. The second row is the selected data bit which is transmitted via switching circuit 326 to XOR circuit 306. The third row shows the exemplary spreading code used for each selected data bit in the second row. The spread data sequence in the fourth row is the XOR of each selected data bit of the second row with the respective chips of the spreading code in the third row. In the first column, for example, an XOR of the selected data bit 0 with spread code 01 produces spread data 01. In the second column, an XOR of selected inverted data bit 0 with spread code 10 also produces spread data 01.

TABLE II

| DATA BIT (0-3) | 0 | 1 | 1 | 0 |
|---|---|---|---|---|
| SELECTED DATA | 0 | 0 | 1 | 1 |
| SPREAD CODE | 01 | 01 | 01 | 01 |
| SPREAD DATA | 01 | 01 | 10 | 10 |

Figure 3C:
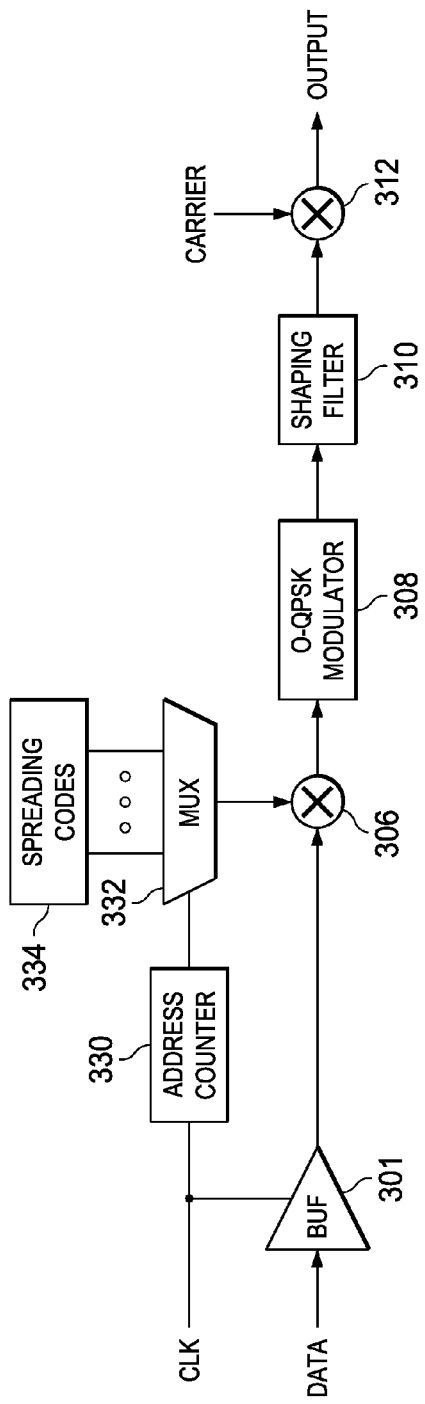

Turning now to FIG. 3C, there is a third embodiment of a wireless transmitter of the present disclosure which may be extended to communication systems with multiple spreading codes. The transmitter of FIG. 3C is similar to the embodiment of FIG. 3A. Memory circuit 334 is arranged to store the multiple spreading codes. Address counter 330 addresses selected spreading codes in memory circuit 334, and multiplex circuit 332 applies the selected spreading codes to XOR circuit 306.

Operation of the transmitter of FIG. 3C will now be explained with reference to Table III below for the previously discussed data sequence and 4-chip spreading. One of ordinary skill in the art having access to the instant specification will understand that the embodiment of FIG. 3C may be extended to any practical data sequence and spreading code. The transmitter receives a sequence of data bits at input buffer 301. Each data bit of the sequence has a respective sequence number (0-3) which is either even or odd. The input buffer 301 is arranged to transmit one bit of the sequence for each cycle of clock signal CLK. The transmitter determines whether the data bit sequence number is even or odd from the least significant bit of address counter 330 and selects the appropriate spreading code shown in the second row of Table III. For example, spreading code 0110 in the first column is selected for the first data bit having even sequence number 0. Spreading code 1001, which is the inverse of 0110, is selected in the second column for the second data bit having odd sequence number 1. XOR circuit 306 then produces a corresponding spread data sequence shown in the third row of Table III. O-QPSK circuit 308 then modulates the spread data sequence and applies the modulated data sequence to shaping filter circuit 310. The filtered data sequence is then modulated 312 by the RF CARRIER and transmitted to a remote receiver.

TABLE III

| DATA BIT (0-3) | 0 | 1 | 1 | 0 |
|---|---|---|---|---|
| SPREAD CODE | 0110 | 1001 | 0101 | 1010 |
| SPREAD DATA | 0110 | 0110 | 1010 | 1010 |

Figure 3D:
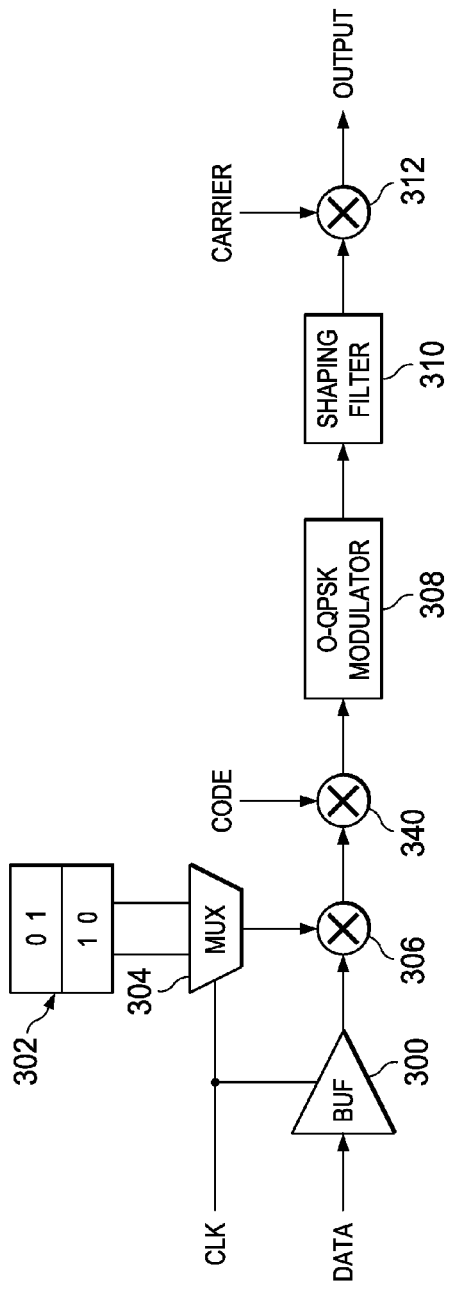

Referring next to FIG. 3D, there is a block diagram of a fourth embodiment of a wireless transmitter of the present disclosure. The transmitter is the same as the transmitter of FIG. 3A except that XOR circuit 340 is added between XOR circuit 306 and modulator circuit 308. In an alternative embodiment, XOR circuit 340 might be added before buffer 300. XOR circuit 340 is coupled to receive a scrambling or whitening code (CODE). The scrambling code is preferably a pseudo random noise (PN) sequence that may be generated by a linear feedback shift register or other suitable means. For example, there may be many local utility transmitters in a network that report to a remote receiver or network hub.

Figure 4A:
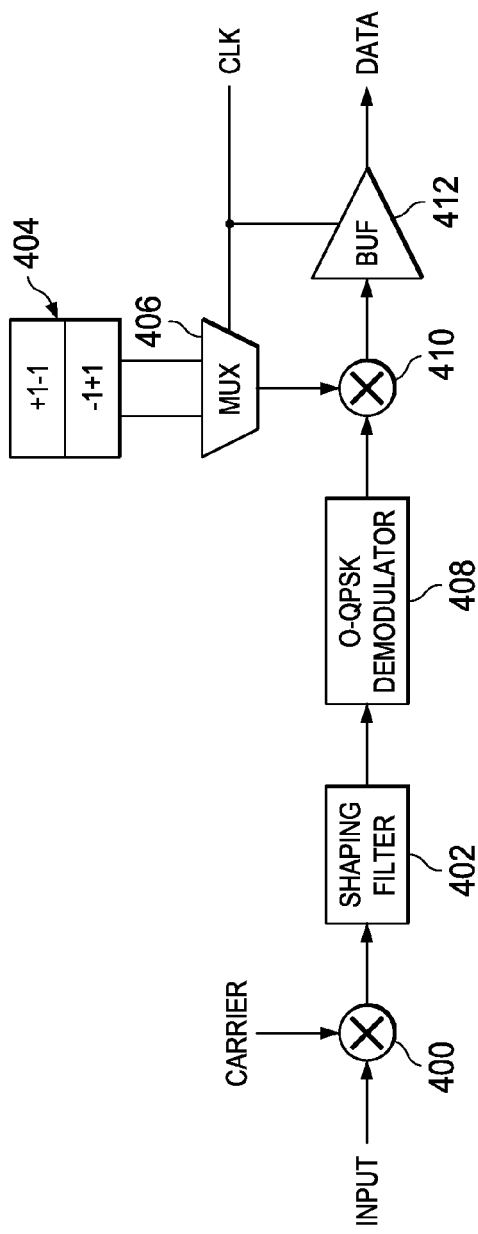
FIGS. 4A through 4C are block diagrams of various embodiments of wireless receivers of the present disclosure.

Referring to FIG. 4A, there is a block diagram of a first embodiment of a wireless receiver of the present disclosure which may be used with the transmitter of FIG. 3A. The receiver includes demodulator circuit 400 which is coupled to receive an input data sequence (INPUT) and RF carrier (CARRIER). Modulator circuit 400 produces a base band signal that is applied to shaping filter 402. The filtered input data is then applied to offset quadrature phase shift keyed (O-QPSK) demodulator 408. The demodulated input data is subsequently applied to multiplier circuit 410. Multiplier circuit 410 receives a selected despreading code from memory circuit 404 via multiplex circuit 406 and applies the resulting despread signal to output buffer 412. Output buffer 412 responsively produces output data sequence (DATA).

Figure 6A:
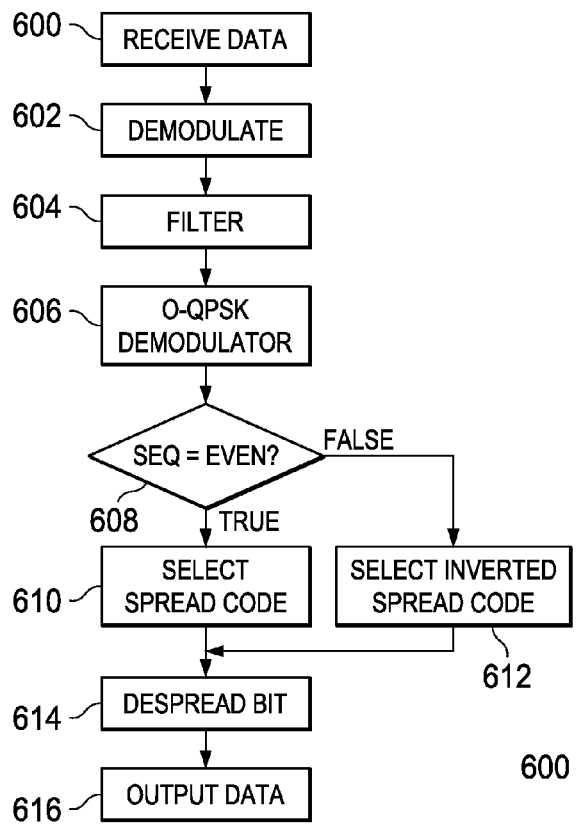
FIGS. 6A and 6B are flow charts showing operation of the receivers of FIGS. 4A and 4B, respectively.

Operation of the receiver of FIG. 4A will now be explained with reference to the flow chart of FIG. 6A for a 2-chip despreading code. A sequence of data bits is received 600 at demodulator circuit 400. Each bit of the sequence has a respective sequence number which is either even or odd. The multiplier circuit demodulates 602 the data sequence with the RF CARRIER to produce a base band signal that is applied to shaping filter 402. The shaping filter 402 filters 604 the data sequence. The resulting data sequence is demodulated 606 by O-QPSK demodulator 408 to produce the data sequence in the first row of Table IV below. This is the same data sequence produced in the third row of Table I above except that after modulation a logical 0 is −1 and a logical 1 is +1. Clock signal CLK operates synchronously with the clock signal of the transmitter of FIG. 3A and is arranged to receive one bit or two chips of the data sequence for each half cycle of clock signal CLK. A low half cycle of clock signal CLK selects despreading code +1−1 from memory circuit 404. Correspondingly, a high half cycle of clock signal CLK selects despreading code −1+1, which is the inverse of despreading code +1−1. In this manner, the receiver determines whether the data sequence is even or odd at step 608. During a low half cycle of CLK, despreading code +1−1 is selected at step 610. Likewise, during a high half cycle of CLK, inverted despreading code −1+1 is selected at step 612. The selected despreading sequence is shown in the second row of Table IV. Multiplier circuit 410 then produces a corresponding despread data sequence at step 614 as shown in the third row of Table IV below. The despread data sequence in the third row is the product of each chip of the modulated data sequence in the first row with the respective chips of the selected despreading code in the second row. In the first column, for example, a product of data chips −1+1 with despreading code +1−1 produces despread data bit −1−1. This has a summed value of −2 and is interpreted as a logical 0. In the second column, a product of data chips −1+1 with despreading code −1+1 produces despread data +1+1. This has a summed value of +2 and is interpreted as a logical 1. Output buffer 412 subsequently produces the data sequence (DATA) at step 616.

TABLE IV

| MOD SEQ (0-3) | −1 +1 | −1 +1 | +1 −1 | +1 −1 |
|---|---|---|---|---|
| DESPREAD CODE | +1 −1 | −1 +1 | +1 −1 | −1 +1 |
| DESPREAD DATA | −1 −1 | +1 +1 | +1 +1 | −1 −1 |
| SUMMED DATA | −2 | +2 | +2 | −2 |

Figure 7:
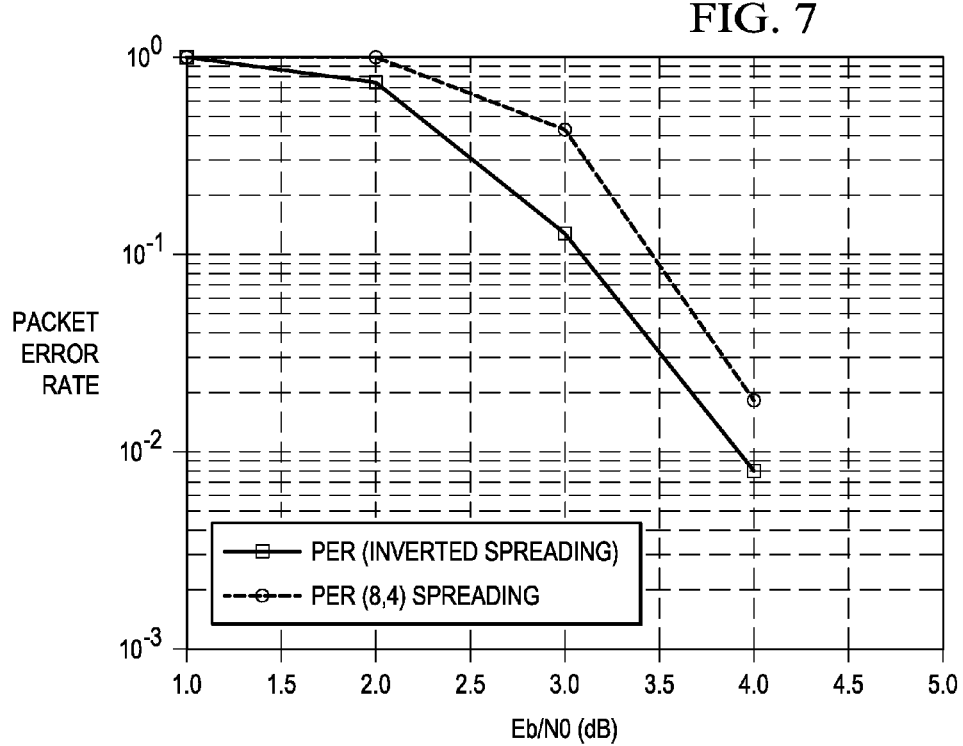
FIG. 7 is a packet error rate diagram comparing standard block coding to inverted spreading according to the present disclosure for (8,4) spreading.

By way of example, the despread data sequence of the third row of Table IV is shown as a hard decision. Thus, a −1−1 for both chips of a data bit is interpreted as a logical 0, and a +1+1 for both chips of a data bit is interpreted as a logical 1. A soft decision, however, is based on receiving a logical 0 chip as approximately a −1 and a logical 1 chip as approximately a +1. The two chips of each bit are preferably averaged or summed after despreading and a negative result is interpreted as a logical 0 data bit. Likewise, a positive sum or average is interpreted as a logical 1 data bit. The 2-chip example of FIG. 4A, therefore, produces two independent samples of each data bit and advantageously provides a high level of noise immunity. Referring to FIG. 7, there is a simulation comparing a conventional (8,4) data signal with an (8,4) data signal with inverted despreading according to FIG. 4A. In the simulation of FIG. 7, a data sequence of 250 bytes is convolutionally encoded with a rate ½, k=7 code. After convolutional encoding the data bits are whitened with a 511 length PN sequence. The packet error rate performance for 2-chip despreading with the (8,4) inverted spreading code is significantly better than with conventional (8,4) encoding. The inverted despreading has about 0.35 dB better performance at 10% packet error rate.

Figure 4B:
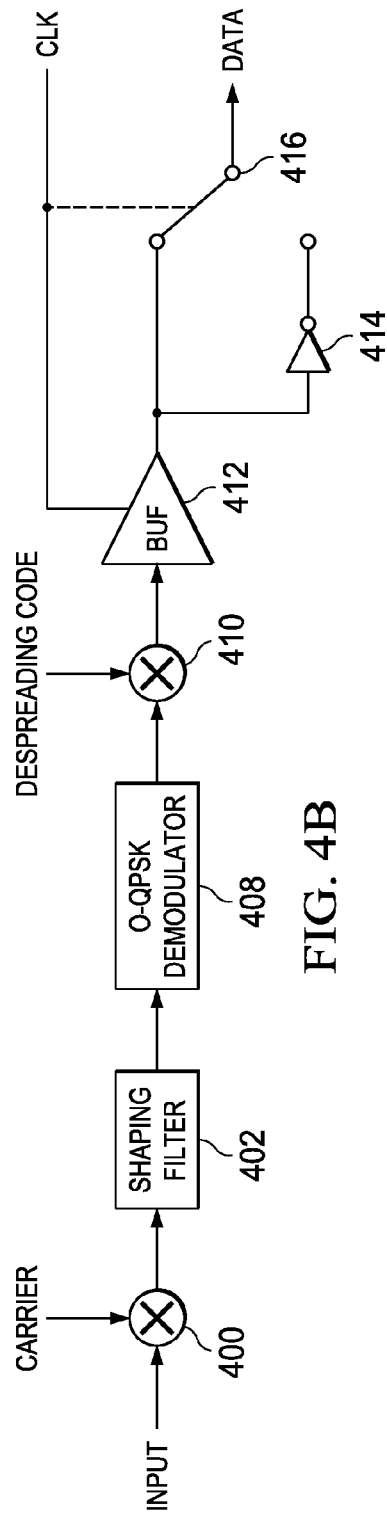

Referring next to FIG. 4B, there is a block diagram of a second embodiment of a wireless receiver of the present disclosure which may be used with the transmitter of FIG. 3B. The receiver of FIG. 4B is similar to the receiver of FIG. 4A except that a single 2-chip despreading code is applied to multiplier circuit 410. The demodulated input data from O-QPSK demodulator 408 is also applied to multiplier circuit 410. Multiplier circuit 410 applies the resulting despread signal to output buffer 412. Output buffer 412 responsively applies the output data sequence to switching circuit 416 and to inverter 414. Switching circuit 416 subsequently produces the data sequence from output buffer 412 or an inverted data sequence from inverter 414. The switching circuit 416 may be a transmission gate or other suitable logic circuit as is well known in the art.

Figure 6B:
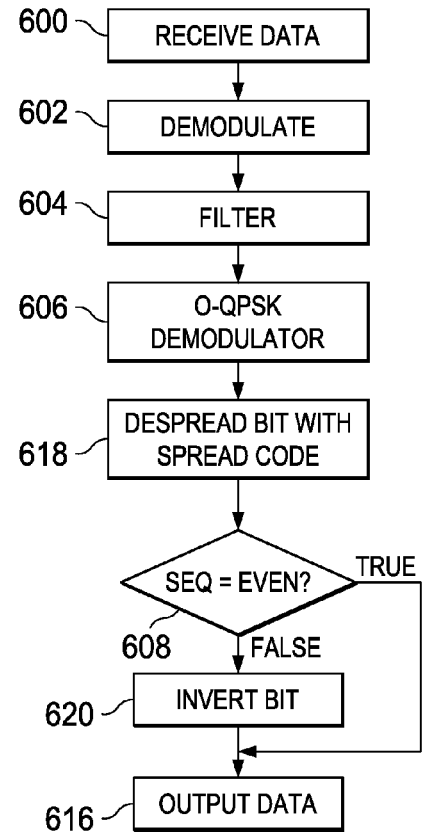

Operation of the receiver of FIG. 4B will now be explained with reference to the flow chart of FIG. 6B for a 2-chip despreading code. A sequence of data bits is received 600 at demodulator circuit 400. Each bit of the sequence has a respective sequence number which is either even or odd. The multiplier circuit demodulates 602 the data sequence with the RF CARRIER to produce a base band signal that is applied to shaping filter 402. The shaping filter 402 filters 604 the data sequence. The resulting data sequence is demodulated 606 by O-QPSK demodulator 408 to produce the data sequence in the first row of Table V below. This is the same data sequence produced in the fourth row of Table II above. The despreading code in the second row of Table V is also applied to multiplier circuit 410 to produce the despread data sequence of the third row. Clock signal CLK operates synchronously with the clock signal of the transmitter of FIG. 3B and is arranged to transmit one bit or two chips of the data sequence through output buffer 412 for each half cycle of clock signal CLK. A low half cycle of clock signal CLK indicates an even data bit. Correspondingly, a high half cycle of clock signal CLK indicates and odd data bit. In this manner, the receiver determines whether the data sequence is even or odd at step 608. During a low half cycle of CLK, output buffer 412 produces output data 616 via switching circuit 416. During a high half cycle of CLK, inverter 414 inverts the data bit 620 and produces inverted output data 616. Thus, despread data having an even sequence number is unchanged in row four. However, despread data having an odd sequence number is inverted in the fourth row. The fifth row shows an average value of the data sequence in the fourth row. As previously explained with regard to Table IV, a negative value in the fifth row is interpreted as a logical 0 and a positive value is interpreted as a logical 1.

TABLE V

| MOD SEQ (0-3) | −1 +1 | −1 +1 | +1 −1 | +1 −1 |
|---|---|---|---|---|
| DESPREAD CODE | +1 −1 | +1 −1 | +1 −1 | +1 −1 |
| DESPREAD DATA | −1 −1 | −1 −1 | +1 +1 | +1 +1 |
| ODD INV DATA | −1 −1 | +1 +1 | +1 +1 | −1 −1 |
| SUMMED DATA | −2 | +2 | +2 | −2 |

Figure 4C:
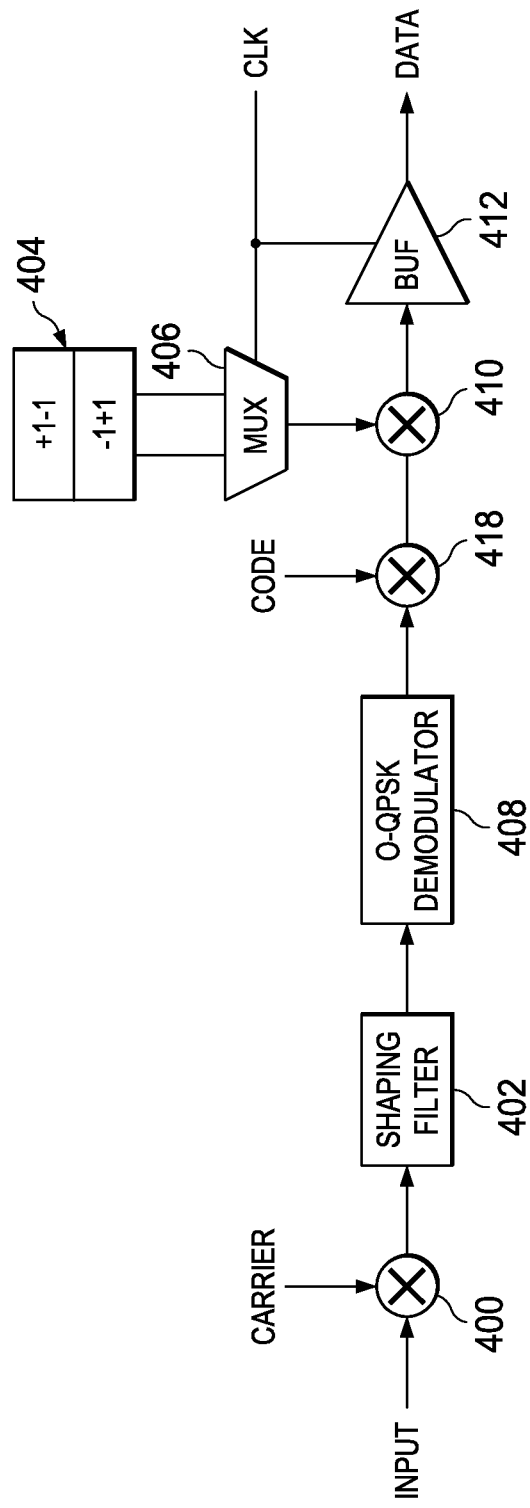

Referring to FIG. 4C, there is a block diagram of a third embodiment of a wireless receiver of the present disclosure which may be used with the transmitter of FIG. 3D. The receiver is similar to the previously discussed receiver of FIG. 4A except that multiplier circuit 418 is added between demodulator circuit 408 and multiplier circuit 410. Multiplier circuit 418 is coupled to receive a scrambling or whitening code (CODE) used by a remote transmitter such as in FIG. 3D. In an alternative embodiment, the despreading code and the descrambling code may be combined by XOR and used with a single multiplier circuit. For example, there may be many remote utility transmitters in the network that report to the receiver or network hub of FIG. 4C.

Figure 8:
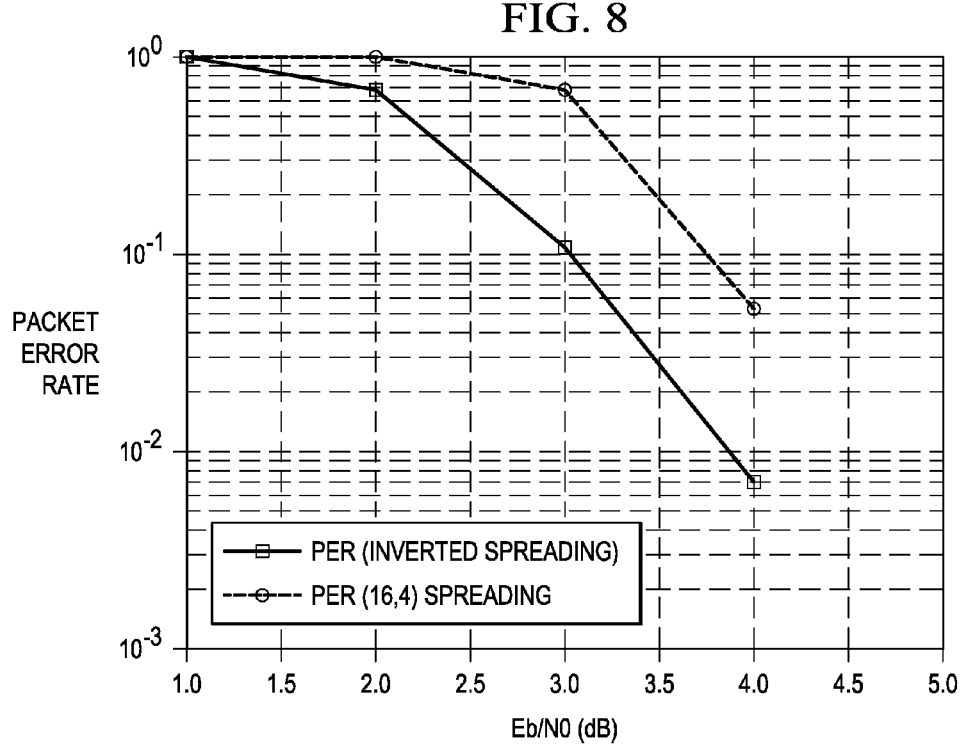
FIG. 8 is a packet error rate diagram comparing standard block coding to inverted spreading according to the present disclosure for (16,4) spreading.

Referring now to FIG. 8, there is a simulation comparing a conventional (16,4) data signal with a (16,4) data signal with inverted spreading according to FIG. 3C and Table III above. One of ordinary skill in the art having access to the instant specification will appreciate that (16,4) encoding with inverted spreading as well as many other encoding and spreading sequences may be applied to any of the previously discussed transmitters of FIGS. 3A through 3D and receivers of FIGS. 4A through 4C. In the simulation of FIG. 8, a data sequence of 250 bytes is convolutionally encoded with a rate ½, k=7 code. After convolutional encoding the data bits are whitened with a 511 length PN sequence. The packet error rate performance for 4-chip spreading with the (16,4) inverted spreading code is significantly better than with conventional (16,4) encoding. The inverted spreading has about 0.7 dB better performance at 10% packet error rate. This is also significantly better than the simulation of FIG. 7, since 4-chip encoding produces four independent samples of each data bit.

Still further, while numerous examples have thus been provided, one skilled in the art should recognize that various modifications, substitutions, or alterations may be made to the described embodiments while still falling with the scope as defined by the following claims. For example, any of the foregoing embodiments of the present disclosure may be implemented in hardware, software, or a combination of hardware and software. Advantages of the present disclosure including improved packet error rate performance, reduced complexity of transmitter and receiver design, and backwards compatibility with legacy systems extend to many other encoding schemes, modulation schemes, and communication systems. Other combinations will be readily apparent to one of ordinary skill in the art having access to the instant specification.

What is claimed is:

1. A transmitter, comprising:
a buffer configured to receive a sequence of data bits, each data bit having a respective sequence number;
a memory circuit storing a first spreading code and a second spreading code inversing the first spreading code; and
an XOR circuit coupled with the buffer, the XOR circuit configured to:
spread a first data bit of the sequence into spread first data bits using the first spreading code determined by the sequence number of the first data bit; and
spread a second data bit of the sequence into spread second data bits using the second spreading code determined by the sequence number of the second data bit.

2. The transmitter of claim 1, wherein:
the first data bit has an even sequence number; and
the second data bit has an odd sequence number.

3. The transmitter of claim 1, further comprising:
a second XOR circuit coupled with the XOR circuit, the second XOR circuit configured to scramble the first and second spread data bits with a scrambling code.

4. The transmitter of claim 1, further comprising:
a modulator coupled with the XOR circuit to apply offset quadrature phase shift keyed (O-QPSK) modulation to the spread first and second data bits.

5. The transmitter of claim 1, wherein the first spreading code includes four chips.

6. A transmitter, comprising:
a buffer configured to receive a sequence of data bits, each data bit having a respective sequence number;
an inverter coupled with the buffer, the inverter configured to invert a first data bit of the sequence in response to the sequence number of the first data bit; and
an XOR circuit alternately coupled with the buffer and the inverter to:
spread the inverted first data bit into spread first data bits using a spreading code; and
spread a second data bit into spread second data bits of the sequence using the spreading code.

7. The transmitter of claim 6, wherein:
the first data bit has an odd sequence number; and
the second data bit has an even sequence number.

8. The transmitter of claim 6, further comprising:
a second XOR circuit coupled with the XOR circuit, the second XOR circuit configured to scramble the first and second spread data bits with a scrambling code.

9. The transmitter of claim 6, further comprising:
a modulator coupled with the XOR circuit to apply offset quadrature phase shift keyed (O-QPSK) modulation to the spread first and second data bits.

10. The transmitter of claim 6, wherein the spreading code includes at least four chips.

11. A receiver, comprising:
a memory circuit storing a first despreading code and a second despreading code inversing the first despreading code; and
an XOR circuit coupled with the memory circuit, the XOR circuit configured to:
receive a first and second groups of spread data bits, each group of spread data bits having a respective sequence number;
despread the first group of spread data bits sharing a first sequence number to generate a first data bit using the first despreading code determined by the first sequence number; and
despread the second group of spread data bits to generate a second data bit using the second despreading code.

12. The receiver of claim 11, wherein:
the first sequence number is an even number; and
the second sequence number is an odd number.

13. The receiver of claim 11, further comprising:
a second XOR circuit coupled with the XOR circuit, the second XOR circuit configured to descramble a first group of scrambled data bits and a second group of scrambled data bits to the first group of spread data bits and the second group of spread data bits respectively with a descrambling code.

14. The receiver of claim 11, further comprising;
a demodulator coupled with the XOR circuit to apply offset quadrature phase shift keyed (O-QPSK) demodulation for generating the first and second groups of spread data bits.

15. The receiver of claim 11, in which the first despreading code includes at least four chips.

16. A receiver, comprising:
a memory circuit storing a despreading code;
an XOR circuit coupled with the memory circuit, the XOR circuit configured to:
receive a first and second groups of spread data bits, each group of spread data bits having a respective sequence number;
despread the first group of spread data bits to generate a first data bit using a spreading code; and
despread the second group of spread data bits to generate a second data bit using the spreading code; and
an inverter coupled with the XOR circuit, the inverter configured to invert the second data bit in response to the sequence number of the second group of spread data bits.

17. The receiver of claim 16, in which;
the first group of spread data bits share an even sequence number; and
the second group of spread data bits share an odd sequence number.

18. The receiver of claim 16, further comprising:
a second XOR circuit coupled with the XOR circuit, the second XOR circuit configured to descramble a first group of scrambled data bits and a second group of scrambled data bits to the first group of spread data bits and the second group of spread data bits respectively with a descrambling code.

19. The receiver of claim 16, further comprising;
a demodulator coupled with the XOR circuit to apply offset quadrature phase shift keyed (O-QPSK) demodulation for generating the first and second groups of spread data bits.

20. The receiver of claim 16, in which the despreading code includes at least four chips.

* * * * *